Figure 1:
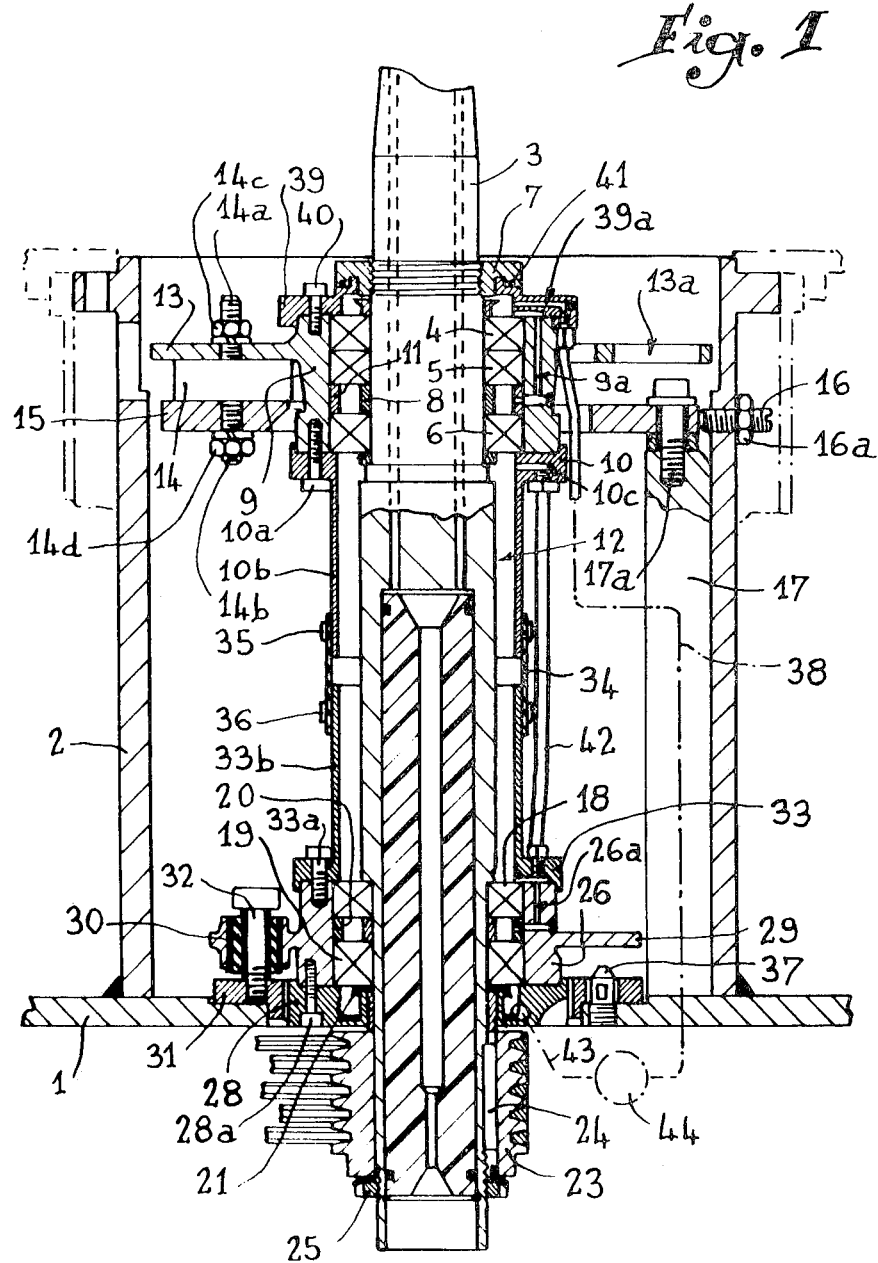

United States Patent [19]

Buffet

[11] 4,412,707

[45] Nov. 1, 1983

[54] BEARING DEVICE FOR CENTRIFUGE

[75] Inventor: Denis Buffet, Meyzieu, France

[73] Assignee: Robatel SLPI, Genas, France

[21] Appl. No.: 336,108

[22] Filed: Dec. 30, 1981

[51] Int. Cl.³ .................... F16C 27/00; F16C 35/08
[52] U.S. Cl. .......................... 308/228; 308/184 R; 308/189 R; 308/187; 494/83
[58] Field of Search ................. 308/26, 32, 58, 59, 308/60, 28, 184 A, 184 R, 187, 189 R, 230, 231, 227, 238, 228, 134.1; 494/82, 83

[56] References Cited

U.S. PATENT DOCUMENTS

| 2,015,784 | 10/1935 | Brown | 308/184 |
|---|---|---|---|
| 2,230,899 | 2/1941 | McGrath | 308/32 X |
| 3,318,644 | 5/1967 | Johnson | 308/134.1 |
| 3,402,822 | 9/1968 | Oyen | 308/230 X |
| 4,109,979 | 8/1978 | Estaque | 308/238 |

FOREIGN PATENT DOCUMENTS

| 2718861 | 4/1977 | Fed. Rep. of Germany . |
| 2263314 | 3/1975 | France . |
| 627166 | 7/1947 | United Kingdom . |

Primary Examiner—Stanley N. Gilreath
Assistant Examiner—David Werner
Attorney, Agent, or Firm—Dowell & Dowell

[57] ABSTRACT

The invention relates to a bearing device for centrifuge, wherein the shaft of the centrifuge is supported by two elementary bearing support bodies mounted elastically on the frame independently of each other by elastic blocks and sleeves. Each body is fixed to a sleeve, these two sleeves, oriented towards each other, being connected by an elastic sheath so as to form a sort of hermetic oil chamber. The shaft drive pulley is of diameter less than that of the openings of the frame which surmount it, so that the assembly composed of the rotating pieces and the bearing arrangement can be extracted through the top by removing some screws, without actual dismantling.

2 Claims, 2 Drawing Figures

BEARING DEVICE FOR CENTRIFUGE

The present invention relates to high-speed centrifuges and more particularly to vertical-axis centrifuges.

The shafts of these machines are subjected to considerable forces due to the inevitable irregularities in the distribution of the solid deposits inside the bowl or container and to the high centrifugal accelerations coming into play. Furthermore, the high speeds of rotation which are imparted thereto require bearings of extremely precise construction. It is then very difficult to produce a bearing arrangement or assembly which can take up these efforts whilst taking into account the inevitable flexures of the shaft and the differences in thermal expansion of the various pieces, and without hindering perfect lubrication of the bearings.

It is an object of the present invention to produce such a bearing or pivoting arrangement which satisifes, better than heretofore, the various conditions laid down by high-speed certifuges.

According to the invention, in a centrifuge whose shaft is supported by two bearings or groups of bearings separated by a certain axial distance, each of these bearings or groups of bearings is mounted in an individual elementary body which is elastically connected to the frame by blocks of rubber or like means, independently of the other body, so as to be able to move in all directions with respect thereto.

Each body preferably comprises a tubular extension which surrounds the shaft, leaving an annular space therearound, these two extension, oriented towards each other, being hermetically connected by a deformable sheath.

The invention also relates to a system of lubrication particularly appropriate for this type of pivoting arrangement.

The invention will be more readily understood on reading the following description with reference to the accompanying drawings, in which:

FIG. 1 is a general axial section through a bearing or pivoting arrangement according to the invention.

Figure 2:
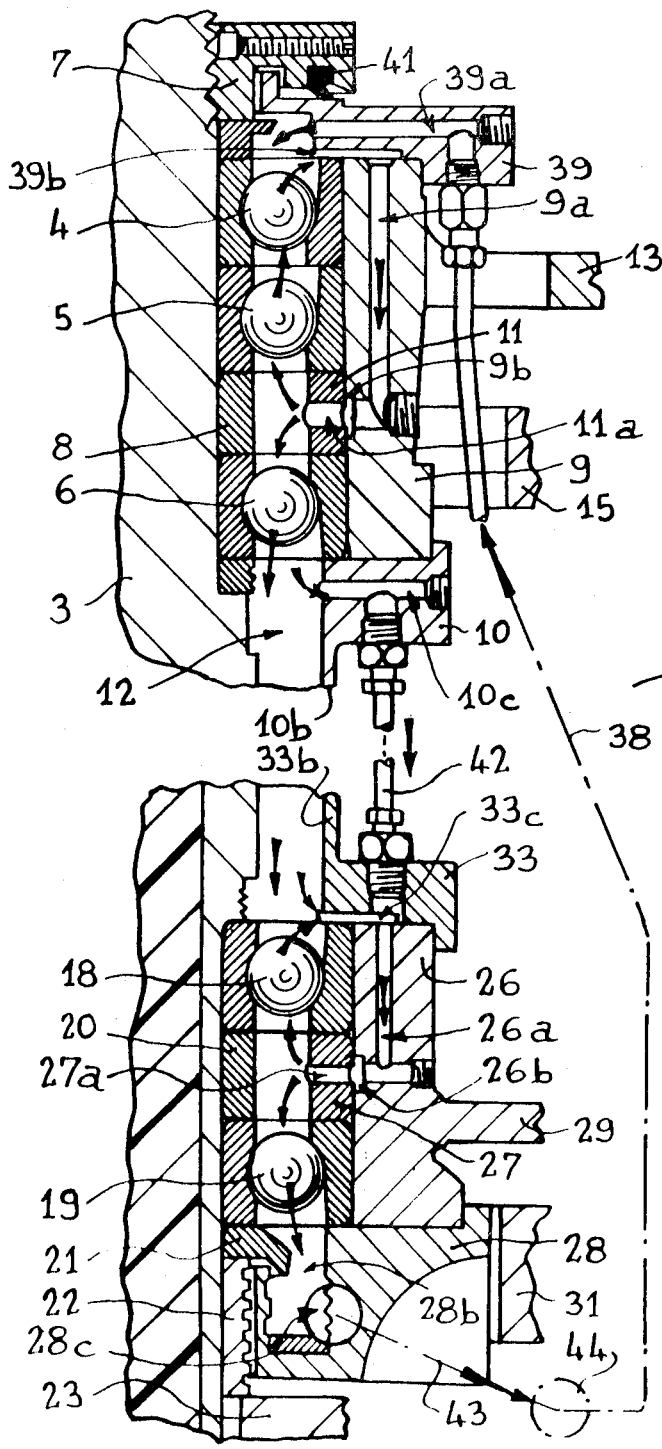

FIG. 2 reproduces to a larger scale the deails of the upper and lower elementary bearings bodies.

Referring now to the drawings, the arrangement shown in section in FIG. 1 corresponds to the central part of the frame of a centrifuge in which is rotatably mounted the vertical shaft which supports the rotating parts of the machine. In the case of FIG. 1, it is a centrifuge whose container may be opened during operation, and driven at very high speed.

One a base plate 1 of this frame is fixed, by welding, a vertical sleeve 2 adapted to support the pivoting arrangement. The shaft 3 of the centrifuge is disposed axaially with respect to this sleeve.

In the top part of the sleeve, this shaft is supported and centered by three bearings 4, 5, 6 shown in detail in FIG. 2. These are precision bearings provided to support an axial load unidirectionally. The first two are oriented to take up the downwardly directed vertical efforts and the third, 6, the upwardly directed ones. The assembly composed of these bearings is clamped on the shaft by a threaded ring 7 with interposition of an annular spacer 8. Furthermore, they are externally mounted to slide in an elementary cylindrical body 9.

the body includes at its lower end a flange 10 connected by a screws 10a and which projects internally so as to form support for the outer rings of of the bearings.

It will be noted that, between those rings which correspond to bearings 5 and 6, an annular spacer 11 is interposed, whose width is identical to that of the inner spacer 8 mentioned above, apart from the adjustment of the axial clearances.

the flange 10 is integral with a tubular extension 10b which extends downwardly over a certain length around the shaft 3, but at a certain distance from the periphery thereof, thus making an intermediate space 12.

The elementary body 9 is fiexed to a ring 13 whose outer diameter is clearly less than the inner diameter of the sleeve 2 at the same level, and this ring rests, via rubber blocks 14 or the like, on another ring 15 comprising a non-rotating annular member which surrounds said body 9 with clearance. As shown, the blocks 14 comprise threaded pins 41a, 14b which have bases sunk in the mass of the associated rubber block 14. The nuts 14c, 14d fix the pins in perforations in the rings 13 and 15 according to a technique well known per se in other applications. Any number of these blocks may be provided, for example three.

The ring 15, which has an appreciable clearance in the sleeve 2, is centered therein by radial adjusting screws 16 with lock nuts 16a and it rests on the base plate 1 via columns 17 to which it is connected by screws 17a. These columns may be angularly distributed between the successive blocks 14, and the ring 13 is perforated above each of them, as indicated at 13a, to allow access to the corresponding screw 17a.

A more or less similar arrangement to the one which has just been described is found in the bottom part of the sleeve 2. The shaft 3 bears two precision bearings 18, 19, the first provided to take up downwardly oriented axial efforts, the second provided for outwardly oriented efforts, these bearings being mounted on the shaft with interposition of an annular spacer 20 and being clamped in position by a stack comprising a seal 21 with deflector lip, a spacer ring 22 whose periphery is grooved to form a labyrinth in the bore passing through the base plate 1, the upper edge of this ring being covered by the said lip, the multi-groove drive pulley 23 fixed on the shaft by the pin 24, and finally the threaded ring 25 which is screwed on this shaft to hold it all. The outer rings of the bearings 18 and 19 are housed in a cylindrical elementary body 26 with interposition therebetween of an annular spacer 27 which, subject to the same remarks as for spacers 8 and 11, has the same width as the above-mentioned spacer 20. This body comprises a lower flange 28 connected by screws such as a 28a and on the projecting inner edge of which abut the rings mentioned above. The body 26 is fixed to a ring 29 which elastic blocks 30 connect to a lower ring 31, which comprises a lower non-rotating annular member which rests on the plate 1, whilst comprising a lower part of smaller radius engaged in the bore passing through said plate to ensure centering. However, here, the elastic blocks 30 are sleeves engaged in hollow cylindrical bosses of the ring 29 through which rods 32 pass to be screwed in the ring 31. It is known that such blocks particularly ensure elasticity in the radial sense, but that they are perfectly capable of supporting axial forces. In addition, as a safety measure, they may be mounted to slide in their housings, which, furthermore, avoids having to keep to strict tolerances.

The body 26 comprises an upper flange 33 fixed by screws 33a and connected with a tubular extension 33b having the same inner and outer diameter as the extension 10b mentioned above, but which stops at a certain distance from the lower end thereof to be connected thereto by a sheath 34 held in place by clamps 35 and 36.

It should be noted that the ring 31 is preferably fixed to the base plate 1 by means of screws (not shown) whose heads are disposed beneath said plate in order to be easily accessible for dismantling operations. This ring is further angularly centered on the plate to facilitate positioning thereof, by means of studs such as 37 with conical free end, which project from this plate and which pass, with a certain clearance, through holes in the ring. Furthermore, it will be understood that the ring 29 has an appreciable clearance with respect to the inner edges of the columns 17 and that, similarly, the flange 28 has a considerable clearance inside the ring 31.

Under these conditions, the assembly constituted by the two elementary bodies 9, 26, the extensions 10b, 33b and the sheath 34, constitutes a sort of bearing housing capable of bending transversely with respect to the axis of the shaft 3, of contracting or of extending longitudinally, and even of undergoing slight torsions. As each elementary body is elastically mounted on the frame individually, the complex bearing which this housing represents may follow, without excessive reaction, all deformations of the shaft and/or of the frame which may result from lack of balance of the load and from the differences in thermal expansion. The fact that the bodies 9 and 26 are radially and axially coupled with the shaft 3 considerably facilitates establishment of the seals.

It will further be noted that the whole of the bearing housing and of its elastic assembly members is held inside the sleeve 2 only by centering screws 16 and the lower plate 31 centered in the bore of the base plate 1. Consequently, by unscrewing said screws 16 and removing the screws for fixing the ring 31 to the base plate 1, this assembly may be easily removed for checks, repairs or replacements, the studs 37 considerably facilitating return into position. In this respect, it should be noted that the diameter of the pulley 23 is less than that of the opening of the plate 1 so that this pulley may remain in place on the shaft during the operation.

Despite its deformability by flexure and in the longitudinal direction, the bearing housing 9-10b-34-33b-26 may also be hermetically sealed and contain the oil intended for the bearings. The latter are preferably lubricated as follows:

It should firstly be noted that the bearings of the type shown in detail in FIG. 2, i.e. adapted to support a unidirectional axial load, act somewhat like pumps in that, if they are rotated in an oil bath, their asymmetry with respect to a mean transverse plane causes them to move the liquid longitudinally towards the side of their outer ring of largest inner diameter.

In the embodiment shown, the oil arrives through a supply pipe 38 into a cap 39 connected on the upper body 9 by screws 40, an O-ring 41 ensuring seal between the ring 7 and the cap 39. A passage 39a guides the oil above the upper bearing 4. However, the cap 39 comprises on its lower face a depression 39b which communicates with one or more channels 9a pierced in the thickness of the body 9 and which terminate in a groove 9b located opposite the spacer 11, which is radially perforated as indicated at 11a. The oil may thus reach the space between the bearings 5 and 6.

It will be understood that, due to the pump effect of the bearings, the oil which emerges from the perforation 11a is partly displaced upwardly by the bearings 4, 5 and partly displaced downwardly by the bearing 6, as indicated by the arrows. The fraction which has passed through this bearing 6 descends into space 12 to reach the lower body 26. In the event of the space 12 not being continuous or comprising any obstacle, an outer connecting pipe 42 may be provided, connecting the respective passages 10c and 33c of the flanges 10 and 33, this pipe naturally being sufficiently flexible in order not to rigidify said housing 9-10b-34-33b-26.

The passage 33c is made in the form of a depression which communicates with one or more channels 26a pierced in the thickness of the body 6 and which open out in a groove 26b opposite which open perforations 27a in the spacer 27. The arrangement is similar to that provided for the upper body 9. There again, the oil which thus arrives between the bearings 18 and 29 circulates in the direction of the arrows. The fraction sent downwardly arrives in a collector groove 28b in the lower flange 28, this groove comprising a tangential opening 28c which an appropriate return pipe 43 connects to the intake of a pump 44. The delivery of this pump is connected to the supply pipe 38. So as not to overburden the drawing unnecessarily, the opening 28c, the return pipe 43, the pump 44 and part of the supply pipe 42 have only been shown schematically.

It will be understood that, with the arrangement which has just been described, lubrication of all the bearings is perfectly ensured despite the pump effect that they comprise.

The preceding description has, of course, been given only by way of example and it in no way limits the domain of the invention, the replacement of the details of execution described by any other equivalents not departing from the scope thereof.

What is claimed is:
1. In a centrifuge,
   (a) a vertical shaft;
   (b) a frame having a base plate, and having a sleeve supported by the base plate and surrounding the shaft;
   (c) upper and lower bearing assemblies comprising vertically spaced upper and lower cylindrical bodies surrounding the shaft within the sleeve and respectively carrying bearings supporting the shaft;
   (d) an upper non-rotating annular member within the sleeve surrounding the shaft and the member having vertical columns depending therefrom and resting on the base plate;
   (e) elastic mounting means supporting the upper cylindrical body on the upper non-rotating annular member;
   (f) a lower non-rotating annular member surrounding the shaft and supported on the base plate;
   (g) elastic mounting means supporting the lower cylindrical body on the lower non-rotating annular member;
   (h) tubular means surrounding the shaft in spaced relation thereto and connected with the upper and lower cylindrical bodies to form with the shaft an intermediate oil conducting space between the bearings in the bodies; and
   (i) centering means comprising at least three screws extending radially through the sleeve opposite the periphery of the upper annular member and adjustably engaging the upper annular member to keep it centered in the frame.
2. In a centrifuge as claimed in claim 1, said bearings in each cylindrical body comprising opposed plural antifriction bearings operative respectively to support axial loads in opposite vertical directions, the opposed bearings in each body having oil spaces extending vertically through them, and each of the cylindrical bodies having oil channels coupled to and communicating with said oil spaces of the bearings; and conduit means operative to recirculate oil through said channels and bearing oil spaces, and from the oil spaces in said upper cylindrical body through said intermediate oil conducting space to the oil spaces in said lower cylindrical body, said bearings having a pumping effect upon the oil in the bearing oil spaces.

* * * * *